UNITED STATES PATENT OFFICE 2,435,403

CYCLIC ALCOHOLS AND THEIR PREPARATION

Rupert C. Morris, Berkeley, and Theodore W. Evans, Oakland, Calif., assignors to Shell Development Company, San Francisco, Calif., a corporation of Delaware No Drawing. Application April 30, 1942, Serial No. 441,245

8 Claims. (Cl. 260—617)

This invention relates to the production of alcohols containing a carbocyclic radical attached to the carbinol group. More particularly, the invention relates to the preparation of saturated alcohols containing a mono- or polycarbocyclic radical attached to the carbinol group. These alcohols which may be represented by the general formula:

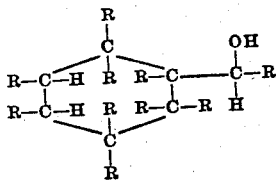

wherein R represents a hydrogen atom or an alkyl, cycloalkyl, alkaryl, aryl or aralkyl radical which may or may not have one or more of the hydrogen atoms substituted by suitable organic or inorganic substituents such as the halogen atoms, the amino group, the hydroxy group, etc. The 2,5 carbon atoms of the cyclic structure represented in the formula may also be members of another ring, such as for example in

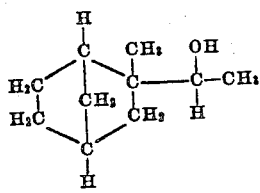

2-methyl, 2-αhydroxy ethyl, bicyclo (2,2,1) heptane, a compound produced by the process of the present invention from cyclopentadiene and methyl isopropenyl ketone.

The process of the invention comprises the condensation of cyclic and/or acyclic polyolefinic hydrocarbons with cyclic and/or acyclic olefinic carbonylic compounds to produce aldehydes or ketones containing an unsaturated carbocyclic radical directly attached to the carbonyl group; and/or the hydrogenation of such unsaturated carbocyclic-substituted aldehydes or ketones to produce the corresponding saturated carbocyclic-substituted alcohols represented by the first formula of paragraph 1; and/or the further hydrogenation of the saturated carbocyclic-substituted aldehydes or ketones of the type derived by hydrogenation of the products of the condensation step to produce the corresponding saturated carbocyclic-substituted alcohols (i. e. the same products as produced in accordance with the first hydrogenation step). The process is particularly applicable, for example, to the production of cyclohexyl methyl carbinol from butadiene and methyl vinyl ketone and/or from cyclohexenyl methyl ketone. Similarly, hexahydro phenyl carbinol may be obtained from butadiene and acrolein and/or from tetrahydro benzaldehyde.

The alcohols containing a saturated carbocyclic radical attached to the carbinol group and prepared in accordance with the process of the invention are valuable solvents, intermediate or starting materials for chemical synthesis as well as useful for many other purposes such as insecticides, plasticizers, drugs, perfumes, etc. Hitherto such alcohols, particularly the secondary alcohols as are here obtained from an αβolefinic ketone and a conjugated diolefin, have been obtained in the laboratory through the Grignard reaction or by the hydrogenation of the corresponding aromatic compounds (as cyclohexylmethylcarbinol from acetophenone) which procedures have produced yields considerably less than the theoretical amount as well as giving various by-products. Also, the prior art on the condensation of such diolefins as butadiene with olefinic alkyl ketones such as methyl vinyl ketone, teaches the use of a solvent, an emulsifying agent, an oxidizing agent, a catalyst, a reaction time of several days and a temperature below the boiling point of the olefinic alkyl ketone. By the present process all of these requirements are obviated. In addition, the employment of aryl and aralkyl ketones, of the type herein described, in the Diels-Alder condensation reaction is new as well as the substances produced by this condensation and by the hydrogenation of these condensation compounds. The latter are novel and useful compounds suitable for such uses as suggested above.

It is accordingly an object of the present invention to overcome the afore-mentioned defects of the prior art and to produce carbocyclic-substituted alcohols of the type above described in high yield, purity and/or in a continuous procedure, from cyclic and acyclic polyolefinic hydrocarbons together with cyclic and acyclic olefinic carbonylic compounds by processes of condensation and hydrogenation. Other objects are to produce the aforementioned carbocyclic-substituted alcohols in high yield and purity by hydrogenation of the corresponding carbonylic compounds containing a saturated or unsaturated carbocyclic radical attached to the carbonyl carbon atom. Still another object is the production of novel compositions of matter. Other objects and advantages will be apparent from the following description.

It has now been found that polyolefinic hydrocarbons (particularly conjugated diolefins) and olefinic carbonylic compounds (in particular those [αβ]olefinic ketones and aldehydes] in which a double bond carbon atom is attached by a single bond to the carbonyl carbon atom) can be made to condense in high yield to produce carbonylic compounds containing an unsaturated carbocyclic radical attached to the carbonyl carbon atom by effecting the reaction above the atmospheric boiling point of one of the reactants, such as the reacting ketone, and, if desired under superatmospheric pressure, contrary to the teachings of the prior art. That is, the ketone or aldehyde may be reacted in the vapor phase or, if in the liquid phase, at a temperature above its normal boiling point and under pressure sufficient at least to maintain it in the liquid phase. The condensation takes place as illustrated by the equation

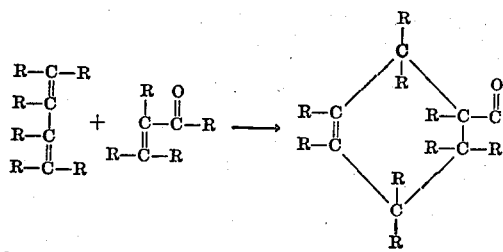

wherein each R is a hydrogen atom or an alkyl, cycloalkyl, alkaryl, aryl or aralkyl radical (which may be further substituted). The reacting diolefin may likewise be a cyclic compound of the type described, in which case a bicyclic aldehyde or ketone is produced, such as the 2-methyl, 2-α-hydroxy ethyl, bicyclo (2,2,1) heptane, supra.

It has also been found that much greater yields of the desired ketones and aldehydes containing an unsaturated carbocyclic radical attached to the carbonyl carbon atom, are obtained in a much shorter time in this manner than by the procedure taught in the prior art as exemplified by U. S. Patent 2,222,357, wherein the condensation of butadiene with methyl vinyl ketone is carried out at a temperature of about 50° C. and below 80° C. (which is the boiling point of methyl vinyl ketone at atmospheric pressure), and requires a solvent, an emulsifying agent, an oxidizing agent and a catalyst as well as requiring four days or longer for substantial completion.

The temperature and reaction time for this condensation step should be regulated with respect to each other. For a higher temperature, a shorter reaction period will effect the same degree of completeness of the reaction as will a lower temperature with a longer reaction time. The upper temperature limit is, in general, that at which substantial polymerization of the reacting material or product takes place. For instance, with methyl vinyl ketone, the dimer may be formed in considerable amount at temperatures not substantially in excess of about 250° C. and at this temperature the reaction of methyl vinyl ketone with butadiene may reach substantial completion in approximately 30 seconds. At 100° C., on the other hand, the same reaction may require an hour and a half or more. The condensation reaction may also be promoted by increased pressure.

This condensation step may be carried out in batch, intermittent or continuous manner. If a continuous mode of operation is desired, this may be conveniently accomplished, for example, by effecting the reaction in the vapor phase and at or near ordinary atmospheric pressure. If operation in a batch or intermittent manner is wanted, this may conveniently be accomplished by confining the unsaturated aldehyde or ketone and the polyolefin in a suitable chamber such as an autoclave and applying a temperature commensurate with the reaction time and pressure as indicated above. If the gaseous reactants are charged to a reaction vessel equipped with a pressure indicator, the progress of the reaction can be gauged by the decrease in pressure since the condensation step is essentially a union of two molecules to form one molecule with a consequent reduction of the vapor pressure in the reactor.

Intimate commingling of the reactants in the execution of the condensation step is desirable. This may be effected, if one or more of the reactants are in the liquid phase, by shaking, stirring or other suitable means; or if the process is being carried out in a continuous vapor phase manner, the gases may be passed through reaction tubes or chambers packed with an inert substance such as quartz chips, glass wool, porcelain chips, Raschig rings of noncatalytic material and the like which also act by way of effecting a more uniform heat transfer in the reaction space, minimizing spots of extreme temperature, etc. The essential apparatus, namely, the reaction tube or chambers, obviously may be of widely varying design, care being taken, however, to fabricate it of material which will not catalyze the polymerization or decomposition of the reactants or products.

Since the two components condense in equimolecular proportions, they may be brought together in approximately this ratio, although this is not essential for their reaction. This condensation step of the process is further illustrated by the following:

*Example I*

In an autoclave was placed 1.0 mol (70 g.) of methyl vinyl ketone and 1.1 mols of butadiene (59 g.). The material was heated for 1.5 hours at 100° C. and then fractionated. Cyclohexenyl methyl ketone, boiling at 100–101° at 50 mm., was obtained in better than 90% yield.

Analysis calculated for $C_8H_{12}O$: C, 77.4; H, 9.68; Br. No., 129. Found: C, 76.9; H, 9.77; Br. No., 126; $d_4^{20}$, 0.9535; $n_D^{20}$, 1.4696.

It has further been found, according to the process of the present invention, that the carbonylic compound which contains an unsaturated carbocyclic radical attached to the carbonyl carbon atom, and which is formed by the above condensation can be selectively hydrogenated in high yield, under carefully controlled conditions as herein described, to produce first the corresponding saturated carbocyclic-substituted ketone or aldehyde and then the corresponding saturated carbocyclic-substituted alcohol. If an aldehyde is employed in the condensation, the hydrogenated product will be a primary alcohol; if a ketone is employed, the hydrogenated product will be a secondary alcohol.

The hydrogenation procedure to produce the saturated carbocyclic-substituted alcohol is carried out at a relatively high pressure. For example, to obtain cyclohexylmethyl carbinol in high yield from cyclohexylmethyl ketone or from cyclohexenyl methyl ketone, a hydrogen pressure of from about 40 to about 100 atmospheres is employed, whereas in hydrogenating cyclohexenyl methyl ketone to cyclohexyl methyl ketone a hydrogen pressure of only about one to about three atmospheres is utilized. Pressures in the region between about three and about forty atmospheres will in general produce mixtures of the saturated carbonylic compound and saturated alcohol in various proportions roughly corresponding to the pressure used. If the unsaturated carbocyclic-substituted carbonylic compound is being hydrogenated in the liquid phase, a solvent may be used for convenience, such as an alcohol, ester, ether and/or a saturated hydrocarbon, although the reaction does not depend on this solvent and may, as in the continuous, consecutive vapor condensation and hydrogenation procedure, be carried on entirely in the vapor phase, the hydrogenation being effected in a further section of the reaction tube or chamber wherein the condensation is taking place. The temperature employed for this higher pressure range is from about 165° C. to about 100° C., the necessary temperature decreasing accordingly to correspond with increased pressure. The optimum reaction conditions, of course, may vary for individual compounds.

A hydrogenation catalyst is conveniently employed to accelerate the reaction. Any of the hydrogenation catalysts known to the art may be utilized with varying degrees of effectiveness. Of those which are especially adapted for such work, Raney's nickel and Adkin's copper-chromium oxide are very efficacious from the viewpoint of both cost and efficiency. Other suitable hydrogenation catalysts are those consisting of or comprising one or more metals, or catalytically active compounds of metals such as Fe, Co, Cu, Pd, Zr, Ti, Th, V, Ta, Ag, Mo, Al and the like. This hydrogenation step of the process is further illustrated by the following:

*Example II*

414 g. of cyclohexenyl methyl ketone prepared as shown in Example I, was placed in a high pressure hydrogenation apparatus together with approximately 5 g. of Raney nickel catalyst per mol of cyclohexenyl methyl ketone. The vessel was heated to 165° C. and the hydrogen pressure raised to 40 atmospheres. After completion of the hydrogenation, there was obtained 380 g. of cyclohexyl methyl carbinol boiling at 108-9° at 50 mm., and at 81-2° at 15 mm.

Analysis calculated for $C_8H_{16}O$: C, 75.0; H, 12.5; acetyl value, 0.78. Found: C, 75.1; H, 12.5; acetyl value, 0.72; $d_4^{20}$, 0.925; $n_D^{20}$, 1.4654.

The polyolefins employed as the starting material according to the present invention, of which the conjugated diolefins are a preferred group, may be such compounds as butadiene-1,3 (bivinyl), isoprene (2-methylbutadiene-1,3), chloroprene (2-chlorbutadiene-1,3), pentadiene-1,3 (piperylene), 2-ethylbutadiene-1,3; 2-haloethyl-butadiene-1,3; 2,3-Me$_2$-butadiene-1,3 (methylisoprene); 1,4-Me$_2$-butadiene-1,3; 2,3-dihalobutadiene-1,3; 2,3-halo ethyl halobutadiene,1,3; furan, cyclopentadiene, cyclohexadiene, anthracene, thiophene, pyrrole, fulvenes, α and β terpinene, α and β phellandrene, mycene and the like, their analogues, homologues and suitable substituted derivatives.

The unsaturated carbonylic compounds utilized as the starting material to condense with the above polyolefins, according to the process of the present invention, of which the αβ olefinic carbonylic compounds are a preferred class, are such compounds as acrolein, α methacrolein, α ethyl acrolein, α propyl acrolein, crotonaldehyde, tiglic aldehyde, β-methyl-crotonaldehyde, αβ dimethyl-crotonic aldehyde, citral, nonadiene-(2,6)-al-(1), methyl vinyl ketone (methylene acetone), methyl isopropenyl ketone, artemesia ketone, vinyl phenyl ketone, propenyl phenyl ketone, methyl cinnamyl ketone, distyryl-ketone, styryl phenyl ketone, ethyl cinnamyl ketone and the like, their analogues, homologues and suitable substituted derivatives.

The principal steps of the present process may be summarized as follows:

1. The condensation of a polyolefinic compound, preferably a conjugated diolefin such as butadiene-1,3, with an olefinic carbonylic compound, preferably an alpha, beta, olefinic aldehyde or ketone such as methyl vinyl ketone, to form an aldehyde or ketone which contains an unsaturated carbocyclic radical attached to the carbonyl carbon atom, such as cyclohexenyl methyl ketone, in high yield, by effecting the reaction either with both reactants in the vapor phase or with one of the reactants, as, for instance, the ketone, at a temperature above its normal boiling point but under sufficient pressure to maintain it in the liquid phase.

2. The selective hydrogenation of the unsaturated carbocyclic-substituted carbonylic compound produced in the above step, or the further hydrogenation of an aldehyde or ketone having a saturated carbocyclic radical attached to the carbonyl carbon atom to produce the corresponding saturated carbocyclic-substituted alcohol, such as cyclohexyl methyl carbinol, in high yield, this hydrogenation step being effected with the carbonylic compound either in the vapor or liquid phase.

3. The process of consecutively effecting the above two steps in the order given as, for instance, by carrying out both the condensation and hydrogenation steps in either the vapor or liquid phase in successive sections of the apparatus in a continuous manner.

This application is a continuation-in-part of our copending application, Serial No. 434,114, filed March 10, 1942, now abandoned.

We claim as our invention:

1. A process for preparing cyclohexyl methyl carbinol from butadiene and methyl vinyl ketone which process comprises reacting butadiene with methyl vinyl ketone at a temperature of about 100° C. and at a pressure sufficient to maintain the methyl vinyl ketone in the liquid phase, reacting the resulting cyclohexenyl methyl ketone with hydrogen in the presence of Raney nickel catalyst at a pressure of about 40 atmospheres and at a temperature of about 165° C., and separating the resulting cyclohexyl methyl carbinol.

2. A process for preparing cyclohexyl methyl carbinol from butadiene and methyl vinyl ketone which process comprises reacting butadiene with methyl vinyl ketone at a temperature of about 100° C. and at a pressure sufficient to maintain the methyl vinyl ketone in the liquid phase, reacting the resulting cyclohexenyl methyl ketone with hydrogen in the presence of Raney nickel catalyst at a pressure of about 40 atmospheres to about 100 atmospheres and at a temperature in the range of from about 100° C to about 165° C, and separating the resulting cyclohexyl methyl carbinol 3. A process for preparing cyclohexyl methyl carbinol from butadiene and methyl vinyl ketone which process comprises reacting butadiene with methyl vinyl ketone at a temperature of about 100° C. and at a pressure sufficient to maintain the methyl vinyl ketone in the liquid phase, reacting the resulting cyclohexenyl methyl ketone with hydrogen in the presence of a hydrogenation catalyst at a pressure of about 40 atmospheres to about 100 atmospheres and at a temperature in the range of from about 100° C. to about 165° C., and separating the resulting cyclohexyl methyl carbinol.

4. A continuous process for preparing cyclohexyl methyl carbinol from butadiene and methyl vinyl ketone which process comprises reacting butadiene with methyl vinyl ketone in the vapor phase and below the temperature at which substantial polymerization of the reactants occurs, reacting the resulting cyclohexenyl methyl ketone with hydrogen in the presence of Raney nickel catalyst at a pressure of about 40 atmospheres to about 100 atmospheres and at a temperature of from about 100° C. to about 165° C., and separating the resulting cyclohexyl methyl carbinol.

5. A continuous process for preparing cyclohexyl methyl carbinol from butadiene and methyl vinyl ketone which process comprises reacting butadiene with methyl vinyl ketone in the vapor phase and below the temperature at which substantial polymerization of the reactants occurs, reacting the resulting cyclohexenyl methyl ketone with hydrogen in the presence of a hydrogenation catalyst at a pressure of about 40 atmospheres to about 100 atmospheres and at a temperature of from about 100° C. to about 165° C., and separating the resulting cyclohexyl methyl carbinol.

6. A continuous process for preparing cyclohexyl methyl carbinol from butadiene and methyl vinyl ketone which process comprises reacting butadiene with methyl vinyl ketone in the vapor phase to form cyclohexenyl methyl ketone, and hydrogenating the cyclohexenyl methyl ketone to cyclohexyl methyl carbinol.

7. A process for preparing cyclohexyl methyl carbinol which comprises reacting butadiene with methyl vinyl ketone in the vapor phase to form cyclohexenyl methyl ketone, and hydogenating the cyclohexenyl methyl ketone to cyclohexyl methyl carbinol.

8. A process for preparing a cyclohexyl methyl carbinol which comprises reacting methyl vinyl ketone with a conjugated diolefin in the vapor phase to form a cyclohexenyl methyl ketone, and hydrogenating the cyclohexenyl methyl ketone to a cycohexyl methyl carbinol.

RUPERT C. MORRIS.
THEODORE W. EVANS.

REFERENCES CITED

The following references are of record in the file of this patent:

UNITED STATES PATENTS

| Number | Name | Date |
| --- | --- | --- |
| 2,197,462 | Bent | Apr. 16, 1940 |
| 2,198,375 | Bruson | Apr. 23, 1940 |
| 2,222,357 | Wolfe | Nov. 19, 1940 |
| 2,230,005 | Moser | Jan. 28, 1941 |
| 2,275,752 | Goldberg | Mar. 10, 1942 |

FOREIGN PATENTS

| Number | Country | Date |
| --- | --- | --- |
| 476,189 | Great Britain | Dec. 3, 1937 |

OTHER REFERENCES

Sabatier, "Comptes Rendus," 139, pages 345 et seq.